United States Patent
Cardinell et al.

(10) Patent No.: US 9,928,196 B2
(45) Date of Patent: Mar. 27, 2018

(54) PROGRAMMING INTERFACE OPERATIONS IN A DRIVER IN COMMUNICATION WITH A PORT FOR REINITIALIZATION OF STORAGE CONTROLLER ELEMENTS

(71) Applicant: International Business Machines Corporation, Armonk, NY (US)

(72) Inventors: Charles S. Cardinell, Tucson, AZ (US); Roger G. Hathorn, Tucson, AZ (US); Steven E. Klein, Tucson, AZ (US); Bernhard Laubli, Green Calley, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 226 days.

(21) Appl. No.: 14/870,393

(22) Filed: Sep. 30, 2015

(65) Prior Publication Data

US 2017/0091132 A1    Mar. 30, 2017

(51) Int. Cl.
   G06F 13/20    (2006.01)
   G06F 13/38    (2006.01)
   G06F 13/42    (2006.01)
   G06F 13/40    (2006.01)

(52) U.S. Cl.
   CPC ........ *G06F 13/385* (2013.01); *G06F 13/4022* (2013.01); *G06F 13/426* (2013.01); *G06F 13/4027* (2013.01)

(58) Field of Classification Search
   None
   See application file for complete search history.

(56) References Cited

U.S. PATENT DOCUMENTS 6,640,247 B1    10/2003    Kishi
2003/0212859 A1*    11/2003    Ellis .................... G06F 3/0613
                                                                711/114

(Continued)

FOREIGN PATENT DOCUMENTS

EP    1246427    10/2002
EP    2386967    11/2011

(Continued)

OTHER PUBLICATIONS

"Information Technology—Fibre Channel Protocol for SCSI, Fourth Version (FCP-4)", American National Standard T10 Project 1828-D, Revision 02b, Jan. 3, 2011, pp. 147.

(Continued)

*Primary Examiner* — Henry Tsai
*Assistant Examiner* — Aurangzeb Hassan
(74) *Attorney, Agent, or Firm* — Rabindranath Dutta; Konrad Raynes Davda & Victor LLP

(57) ABSTRACT

A driver of a host bus adapter of a storage controller performs hardware resets of buses and other logic to which an embedded port of the host bus adapter is connected, in a first period of quiescing of I/O operations in the embedded port. The driver transmits one or more commands to the embedded port to resume selected I/O operations in the embedded port. A reinitialization of the driver is performed during a second period of quiescing of I/O operations in the embedded port, prior to sending a command to allow normal I/O operations in the embedded port.

15 Claims, 12 Drawing Sheets

(56) References Cited

U.S. PATENT DOCUMENTS

| | | | |
|---|---|---|---|
| 2005/0021605 A1* | 1/2005 | Davies | G06F 11/1456 709/203 |
| 2005/0108456 A1 | 5/2005 | Boutcher et al. | |
| 2006/0047879 A1* | 3/2006 | Hack | G06F 13/423 710/302 |
| 2011/0047195 A1 | 2/2011 | Le et al. | |
| 2013/0151646 A1* | 6/2013 | Chidambaram | H04L 47/6205 709/213 |
| 2014/0195480 A1 | 7/2014 | Talagala et al. | |
| 2014/0280398 A1 | 9/2014 | Smith et al. | |

FOREIGN PATENT DOCUMENTS

| | | |
|---|---|---|
| WO | 2007002334 | 1/2007 |
| WO | 2010132210 | 11/2010 |

OTHER PUBLICATIONS

R. Riesen, et al., "Operating System Strategies", InEncyclopedia of Parallel Computing, Springer US, 2011, pp. 1391-1401.

R. Garg, et al., "A Generic Checkpoint-Restart Mechanism for Virtual Machines", arXiv preprint arXiv,:1212.1787 [cs.OS] Dec. 8, 2012, pp. 16.

"Fibre Channel Single-Byte Command Code Sets Mapping Protocol—5 (FC-SB-5)", Rev. 2.00, American National Standard for Information Technology, Mar. 26, 2013, pp. 269.

"Fibre Channel Link Service (FC-LS-3)", Rev. 3.10, American National Standard for Information Technology, Feb. 1, 2014, pp. 207.

"Fibre Channel Framing and Signaling—4 (FC-FS-4)", Rev. 1.20, American National Standard for Information Technology, Jul. 21, 2015, pp. 463.

U.S. Appl. No. 14/870,410, filed Sep. 30, 2015, by inventors C.S. Cardinell, R.G. Hathorn, S.E. Klein and B. Laubli.

U.S. Appl. No. 14/870,385, filed Sep. 30, 2015, by inventors R.G. Hathorn, B.W. Holley, and S.E. Klein.

U.S. Appl. No. 14/870,422, filed Sep. 30, 2015, by inventors M.P. Bendyk, C.S. Cardinell, R.G. Hathorn, and S.E. Klein.

U.S. Appl. No. 14/870,549, filed Sep. 30, 2015, by inventors R.G. Hathorn, S.E. Klein and M.W. Welsh.

U.S. Appl. No. 14/870,554, filed Sep. 30, 2015, by inventors R.G. Hathorn, S.E. Klein and M.W. Welsh.

U.S. Appl. No. 14/870,569, filed Sep. 30, 2015, by inventors R.G. Hathorn, S.E. Klein and M.W. Welsh.

List of Patents or Patent Applications Treated as Related, dated Sep. 30, 2015, pp. 2.

Office Action dated Jun. 30, 2017, pp. 12, for U.S. Appl. No. 14/870,410, filed Sep. 30, 2015.

Response dated Oct. 2, 2017, pp. 11, to Office Action dated Jun. 30, 2017, pp. 12, for U.S. Appl. No. 14/870,410, filed Sep. 30, 2015.

* cited by examiner

PROGRAMMING INTERFACE OPERATIONS IN A DRIVER IN COMMUNICATION WITH A PORT FOR REINITIALIZATION OF STORAGE CONTROLLER ELEMENTS

BACKGROUND

1. Field

Embodiments relate to the programming of interface operations in a driver in communication with a port for reinitialization of storage controller elements.

2. Background

A storage controller may control access to storage for one or more host computational devices that may be coupled to the storage controller over a network. A storage management application that executes in the storage controller may manage a plurality of storage devices, such as disk drives, tape drives, flash drives, etc., that are coupled to the storage controller. A host may send Input/Output (abbreviated as I/O or I/O) commands to the storage controller and the storage controller may execute the I/O commands to read data from the storage devices or write data to the storage devices.

A host bus adapter (HBA) may comprise a circuit board and/or integrated circuit based adapter that may include components such as a Fibre Channel interface chip, where the Fibre Channel interface chip may be referred to as an embedded port. The host bus adapter may provide I/O processing and provide physical connectivity for the storage controller to a storage area network (SAN), where the storage area network includes a Fibre Channel switched fabric. The storage controller (via the host bus adapter) may act as a target that receives I/O commands from the one or more host computational devices, where the one or more host computational devices act as initiators of the I/O commands.

Communication between the hosts and the storage controller may occur over a Fibre Channel (FC) network, where Fibre Channel refers to an integrated set of architectural standards for data transfer being developed by the American National Standards Institute. Fibre Channel is a high-speed network technology primarily used for storage area networks. Fibre Channel Protocol (FCP) is a transport protocol that predominantly supports transports commands over Fibre Channel networks.

Fibre Channel may be split into five layers: a Protocol-mapping layer (FC-4), a common service layer (FC-3), a network layer (FC-2), a data link layer (FC-1), and a FC-0 layer that defines the physical link in the system, including the fibre, connectors, optical and electrical parameters for a variety of data rates. Layers FC-0 through FC-2 are also known as FC-PH, the physical layers of Fibre Channel, whereas FC-3 and FC-4 layers define how Fibre Channel ports interact with applications in computational devices. The FC-3 level of the FC standard is intended to provide the common services for features such as striping, multicasting, etc.

FC-4, the highest layer in Fibre Channel, defines the application interfaces that execute over Fibre Channel. FC-4 specifies the mapping rules of upper layer protocols using the FC layers below. FC-4 is formed by a series of profiles that define how to map legacy protocols to Fibre Channel. Fibre Channel is capable of transporting both network and channel information, and profiles for network and channel protocols, such as, Small Computer System Interface (SCSI), Intelligent Peripheral Interface (IPI), High Performance Parallel Interface (HIPPI) Framing Protocol, Internet Protocol (IP), Link Encapsulation (FC-LE), Single-Byte Command Code Set Mapping (SBCCS), etc., may be specified or proposed as protocol mappings in FC-4.

Fibre Connection (FICON) is a protocol of the fibre channel architecture and may also be referred to by the formal name of FC-SB-5. FICON is a protocol layer that builds upon the Fibre Channel transport protocol. Further details of Fibre Channel protocol mapping for the Single-Byte Command Code Sets may be found in the publication, "Fibre Channel Single-Byte Command Code Sets Mapping Protocol-5 (FC-SB-5)", Rev. 2.0, published by the American National Standards Institute on Mar. 26, 2013.

The basic building blocks of a Fibre Channel connection are called "Frames". The frames contain the information to be transmitted (Payload), the address of the source (i.e., initiator) and destination (i.e., target) ports and link control information. Frames are broadly categorized as data frames and link control frames. Details of framing and signaling aspects of Fibre Channel may be found in the publication, "Fibre Channel Framing and Signaling-4 (FC-FS-4)", Rev. 1.20, published by the American National Standard for Information Technology on Jul. 21, 2015. Details of link services aspects of Fibre Channel may be found in the publication, "Fibre Channel Link Services (FC-LS-3)", Rev. 3.10, published by the American National Standard for Information Technology on Feb. 1, 2014. The Fibre Channel Protocol for SCSI Fourth Version (FCP-4) standard describes the frame format and protocol definitions required to transfer commands and data between a SCSI (Small Computer System Interface) initiator and target using the Fibre Channel family of standards. Further details of FCP-4 may be found in the publication, "Information Technology—Fiber Channel Protocol for SCSI, Fourth Version (FCP-4), Revision 02b" published by the International Committee for Information Technology Standards, on Jan. 3, 2011.

The storage controller may include a plurality of host bus adapters, where each host bus adapter may include a Fibre Channel Interface chip that is an interface to switches that allow communication over a Fibre Channel network between the storage controller and the plurality of hosts.

Fibre Channel storage area networks may use the Fibre Channel protocol (used by the hardware to communicate), the SCSI protocol (used by software applications to communicate to disks), and other protocols for communication. In Fibre channel, network connections are established between node ports (N_Ports) that are there in computers, servers, storage controllers, storage devices, printers, etc., and fabric ports (F_Ports) that are there in the Fibre channel switched fabric. A Fibre Channel switched fabric relies on one or more switches to establish direct, point-to-point connections between the source and target devices. Each Fibre Channel interface chip in the host bus adapters of the storage controller comprises a port that allows communication of the storage controller to the hosts over the Fibre Channel switched fabric.

SUMMARY OF THE PREFERRED EMBODIMENTS

Provided are a method, a system, and a computer program product in which a driver of a host bus adapter of a storage controller performs hardware resets of buses and other logic to which an embedded port of the host bus adapter is connected, in a first period of quiescing of I/O operations in the embedded port. The driver transmits one or more commands to the embedded port to resume selected I/O operations in the embedded port. A reinitialization of the driver is performed during a second period of quiescing of I/O operations in the embedded port, prior to sending a command to allow normal I/O operations in the embedded port.

In further embodiments, in response to determining that an error has occurred in the storage controller, a first set of commands is transmitted to the embedded port of the host bus adapter to cause the embedded port to enter into the first period of quiescing of I/O operations, wherein the hardware resets of buses and other logic to which the embedded port is connected are performed during the first period. Configuration space registers of the buses and other logic are restored to a state prior to performing of the hardware resets, prior to transmitting the one or more commands to the embedded port to resume the selected I/O operations.

In additional embodiments, subsequent to resumption and completion of the selected I/O operations, a second set of commands is transmitted to the embedded port to cause the embedded port to enter into the second period of quiescing of I/O operations, wherein the reinitialization of the driver is performed during the second period.

In certain embodiments, the transmitted first set of commands comprises requests to perform operations in the embedded port including: quiescing processing of received frames from a link; latching states of selected hardware inputs; completing active direct memory access into driver memory; deferring processing of link transitions; stopping all accesses to driver memory; and dequeing any messages to be sent to the driver.

In further embodiments, the one or more commands to resume selected I/O operations in the embedded port include requests to: resume processing of received frames from a link; enable detection and processing of link transitions; requeue any held messages to the driver; and send a notification message to each response queue indicating completion of the selected I/O operations.

In additional embodiments, the second set of commands comprise options to allow partial direct memory access (DMA) activity to the driver memory and to synchronize queue pointers, wherein the second set of commands requests the embedded port to: stop processing of received frames from a link; complete active DMA into driver memory; defer processing link transitions; stop a majority of accesses to driver memory, while allowing access to memory extensions provided to the embedded port by the driver; and synchronize queue pointers on request queues by discarding any messages on the request queues and updating the request queue out pointers.

In further embodiments, the second set of commands further comprises sending a message to the embedded port to terminate any remaining exchanges including operations to: send abort sequence (ABTS) for every open exchange without sending response messages to the driver; not send ABTS to host systems that have been indicated in port control block to not receive ABTS; access host memory for offloaded exchanges to determine state information; and relinquish control of all buffer and I/O control block (IOCB) resources associated with the driver.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In enterprise storage control units, such as a storage controller, recovery from logic errors needs to be performed in a timely manner to avoid introducing noticeable increases in response times for recovery. In certain embodiments, a fast reset or warmstart process may be used to reinitialize the storage controller elements, such as servers and host adapters, into a known state without performing a cold reset or initial program load. During this reset process the impact to active host I/O is minimized.

Certain embodiments minimize the impact to host I/O when performing a fast reset on a host bus adapter, where the host bus adapter includes an embedded port that provides an interface to a Fibre Channel fabric, where the embedded port communicates with a driver of the host bus adapter. The driver of the host bus adapter may communicate and control operations of the embedded port. The communication mechanism between the driver and the embedded port uses an application programming interface (API).

In certain embodiments, a host bus adapter directed multistep restart uses two quiesce periods for host I/O operations. In a first quiesce period, the embedded port stops processing any incoming frames and stops direct memory access (DMA) access from the embedded port. The first quiesce period allows for the resetting of host adapter hardware such as a controller Application Specific Integrated Circuits (ASIC) and hot resets of Peripheral Component Interconnect Express (PCIe) buses to which the embedded port is connected. A second quiesce process allows for reinitialization of the host adapter processor's internal structures and state by reinitialization of the driver and subsequently normal I/O operations are resumed for the embedded port.

Exemplary Embodiments

Figure 1:
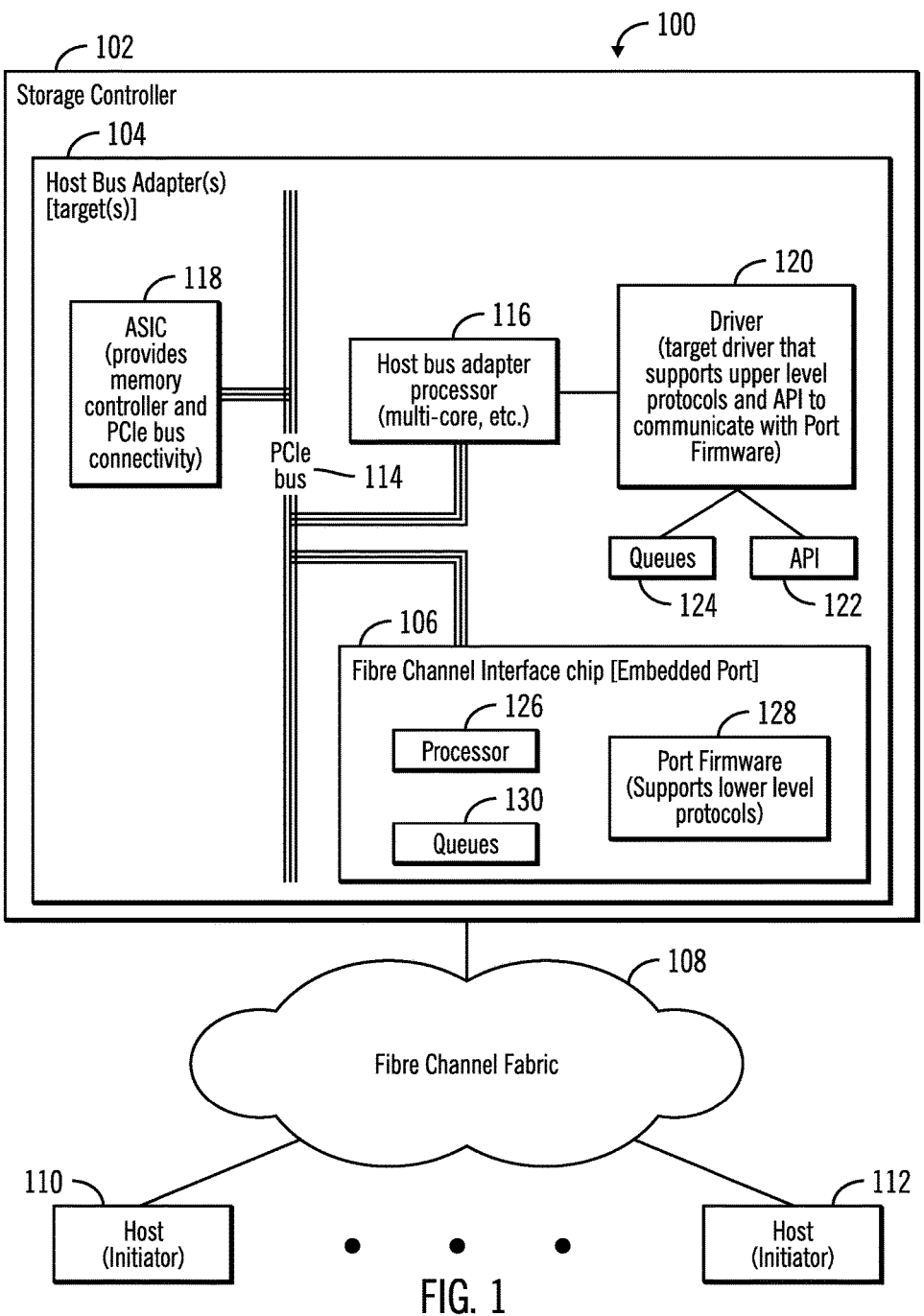
FIG. 1 illustrates a block diagram of a computing environment comprising a storage controller that includes one or more host adapters with one or more Fibre Channel interface chips to couple the storage controller to a Fibre Channel fabric to communicate with a plurality of hosts, in accordance with certain embodiments.

FIG. 1 illustrates a block diagram of a computing environment 100 comprising a storage controller 102 that includes one or more host adapters 104 with one or more Fibre Channel interface chips 106 to couple the storage controller 102 to a Fibre Channel fabric 108, to communicate with a plurality of hosts 110, 112, in accordance with certain embodiments.

The storage controller 102 that includes the host bus adapter 104 may control storage devices (not shown), and receive I/O commands from the hosts 110, 112. The storage controller 102 and the hosts 110, 112 may comprise any suitable computational device including those presently known in the art, such as, a personal computer, a workstation, a server, a mainframe, a hand held computer, a palm top computer, a telephony device, a network appliance, a blade computer, a processing device, etc. In certain embodiments the storage controller 102 may be comprised of one or more storage servers. A plurality of storage servers may provide redundancy because if one storage server undergoes a failure from which recovery is not possible, an alternate storage server may perform the functions of the storage server that failed. The storage controller 102 and the hosts 110, 112 may be elements in any suitable network, such as, a storage area network, a wide area network, the Internet, an intranet. In certain embodiments, the storage controller 102 and the hosts 110, 112 may be elements in a cloud computing environment.

In FIG. 1, the storage controller 102 may include one or more host bus adapters 104 that operate as targets of I/O operations initiated by one or more hosts 110, 112. The host bus adapter 104 does not have control over the arrival of host I/O operations. In certain embodiments, each host bus adapter 104 may be in the form of an adapter card that is plugged into the Peripheral Component Interconnect Express (PCIe) slot of the storage controller 102.

The host bus adapter 104 may include a PCIe bus 114 to which a host bus adapter processor 116 and the Fibre Channel interface chip 106 are coupled. An ASIC 118 may reside in the host bus adapter 104, where the ASIC 118 provides a memory controller and PCIe bus connectivity.

The host bus processor 116 may be a single-core or a multi-core processor. A driver 120 that supports upper level protocols e.g., FCP, FICON, FC-4 layer standards, etc., executes operations on the host bus adapter processor 116. The driver 120 communicates with the Fibre Channel interface chip 106 by using an application programming interface (API) 122. Various data structures, such as queues 124 are maintained by the driver 120. In certain embodiments, the driver 120 may be implemented in software, hardware, firmware or any combination thereof.

The Fibre Channel Interface Chip 106 is also referred to as an embedded port. The embedded port 106 includes a processor 126 and a port firmware 128 that supports lower level protocols like those for framing, signaling, etc. In certain embodiments, functions of the port firmware 128 may be implemented in software, hardware, firmware or any combination thereof. Various data structures, such as queues 130 (e.g., request queues) are maintained by the port firmware 128. The embedded port 106 supports lower level protocols of Fibre Channel and the driver 120 supports upper level protocols. The embedded port 106 that supports lower level protocols of Fibre Channel connects the host bus adapter 104 to the Fibre Channel fabric 108.

The hosts 110, 112 may send I/O commands to the storage controller 102 over the Fibre Channel fabric 108. The embedded port 106 receives the Fibre Channel frames corresponding to the request. The driver 120 which supports upper level protocols of Fibre Channel is in communication with the embedded port 106. The driver 120 uses the embedded port 106 and communicates via the upper level protocols with the hosts 110, 112, and responds to I/O commands via the embedded port 106.

Therefore, FIG. 1 illustrates certain embodiments in which a driver 120 of a host bus adapter 104 in association with the port firmware 128 of an embedded port 106 allows the host bus adapter 104 to process and respond to I/O commands from one or more hosts 110, 112.

Figure 2:
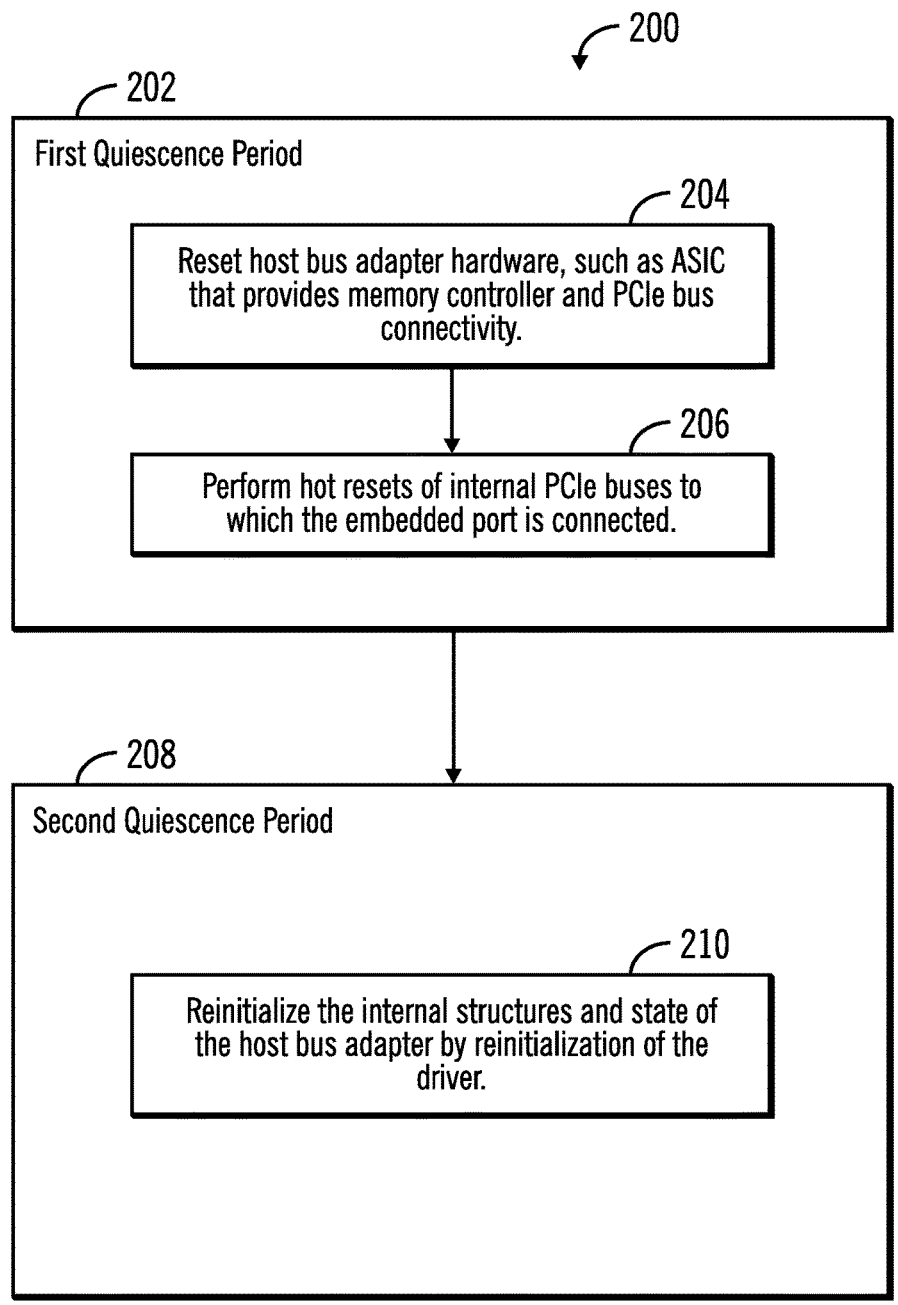
FIG. 2 illustrates a first flowchart that show operations in a first and a second quiescence period of a driver and an embedded port using an application programming interface for reinitialization of storage controller elements, in accordance with certain embodiments.

FIG. 2 illustrates a first flowchart 200 that show operations in a first and a second quiescence period of a driver 120 and an embedded port 106 using an application programming interface 122 for reinitialization of elements of the storage controller 102, in accordance with certain embodiments.

In a first quiescence period 202, the driver 120 requests embedded port 106 to quiesce (i.e., suspend) I/O operations, and during this first period of quiescence the driver 120 resets (at block 204) host bus adapter hardware, such as the ASIC 118 that provides memory controller and PCIe bus connectivity, and performs (at block 206) hot resets of internal PCIe buses 114 to which the embedded port 106 is connected. Subsequently, the quiesced I/O operations are processed.

It should be noted that the operations of the first quiescence period 202 resets the logic and hardware resources that may have been affected by an error event, such that the logic and hardware resources are placed in a known state and may be used between the first quiescence period 202 a second quiescence period 208 to process the incoming I/O requests, in such a way that the number of incoming requests on a path from the initiator to the storage target are reduced. For example, control unit busy status or other messages such as process logout (PRLO) may be sent to initiators to slow the rate of incoming I/O requests (or stop incoming I/O requests) that may be discarded during the second quiescence period 208. As a result, a reduction is made in I/Os during reset events.

In a second quiescence period 108, the driver 120 is reinitialized and the internal structures and the storage of the host bus adapter 104 are reinitialized. Subsequently, normal processing of I/O operations is performed by the embedded port 106 via the port firmware 128.

Figure 3:
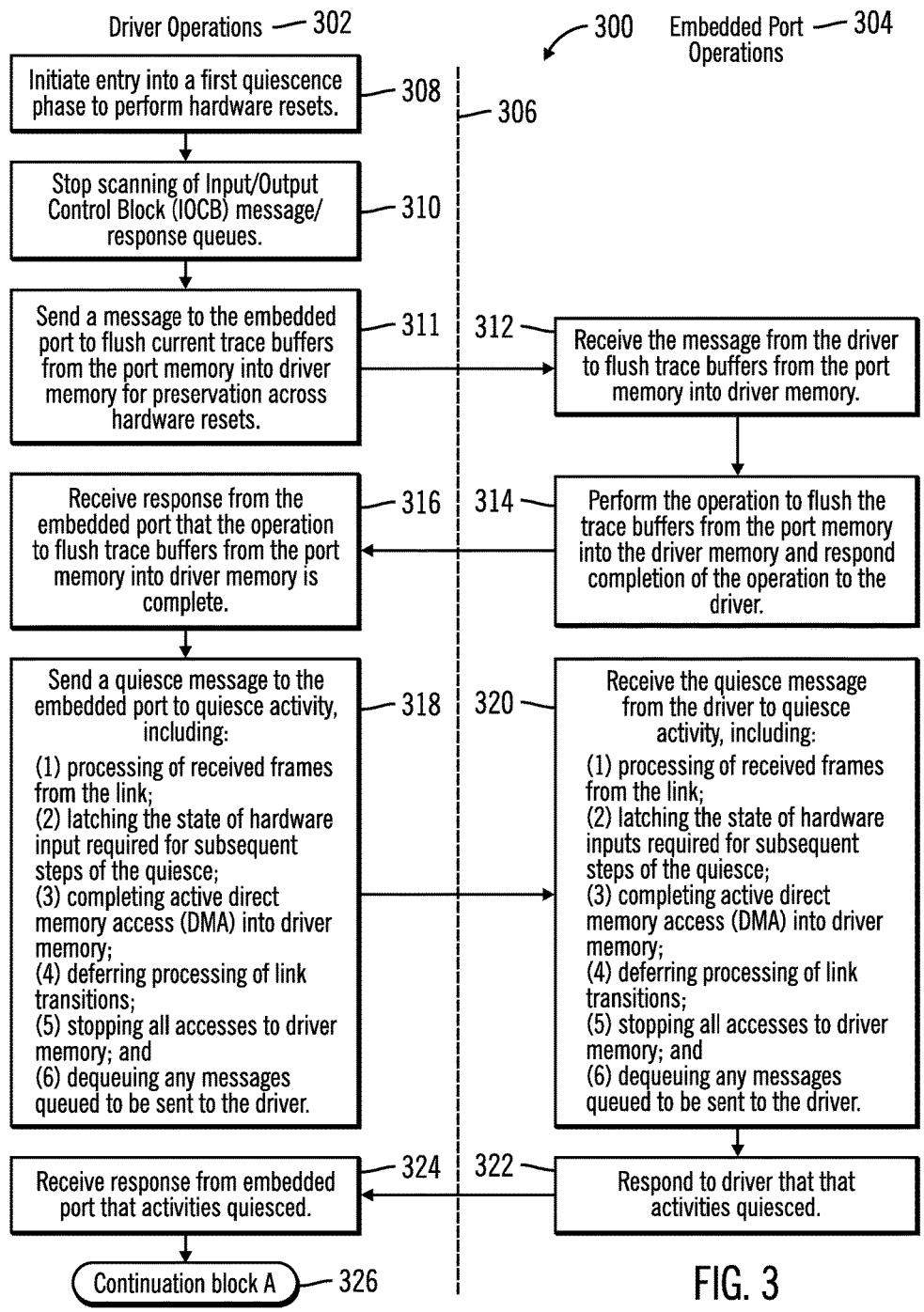
FIG. 3 illustrates a second flowchart that shows operations of a driver and an embedded port that use the application programming interface for reinitialization of storage controller elements, in accordance with certain embodiments.

FIG. 3 illustrates a second flowchart 300 that shows operations of a driver 120 and an embedded port 106 that use the application programming interface for reinitialization of storage controller elements, in accordance with certain embodiments. The driver operations 302 and the embedded port operations 304 are shown to the left and right of the dashed line 306 respectively.

Control starts at block 308 in which the driver 120, in response to determining that an error has occurred in the storage controller 102 that needs reinitialization of storage controller components, initiates an entry into a first quiescence phase to perform hardware resets. Control proceeds to block 310 in which the driver 120 stops scanning of Input/Output Control Blocks (IOCB) in message/response queues. The driver 120 sends (at block 311) a message to the embedded port 106 to flush current trace buffers from the port memory into driver memory for preservation across hardware resets.

The embedded port 106 receives (at block 312) the message from the driver 120 to flush trace buffers from the port memory into driver memory. The embedded port 106 performs the operation to flush the trace buffers from the port memory into the driver memory and responds (at block 314) completion of the operation to the driver 120.

The driver 120 receives (at block 316) the response from the embedded port 106 that the operation to flush trace buffers from the port memory into driver memory is complete. Control proceeds to block 318 in which the driver 120 sends a quiesce message to the embedded port 106 to perform operations associated with quiescing, including:
(1) the processing of received frames from the link;
(2) latching the state of hardware inputs needed for subsequent steps of the quiescing [e.g. latching the state of the Auto SCSI Status Inhibit and General Purpose IO (ASSI GPIO) input];
(3) completing active direct memory access (DMA) into driver memory;
(4) deferring processing of link transitions;
(5) stopping all accesses to driver memory; and
(6) dequeuing any messages queued to be sent to the driver.

Control proceeds to block 320, which the embedded port 106 receives the quiesce message from the driver 106 to perform quiesce activities, including:
(1) processing of received frames from the link;
(2) latching the state of hardware inputs needed for subsequent steps of the quiescing;
(3) completing active direct memory access (DMA) into driver memory;
(4) deferring processing of link transitions;
(5) stopping all accesses to driver memory; and
(6) dequeuing any messages queued to be sent to the driver.

The embedded port 106 then responds (at block 322) to the driver 120 that the activities have been quiesced. The driver 120 receives (at block 324) the response from the embedded port 106 that activities have been quiesced and control proceeds to continuation block A 326 which continues the flowchart in a subsequent figure.

Figure 4:
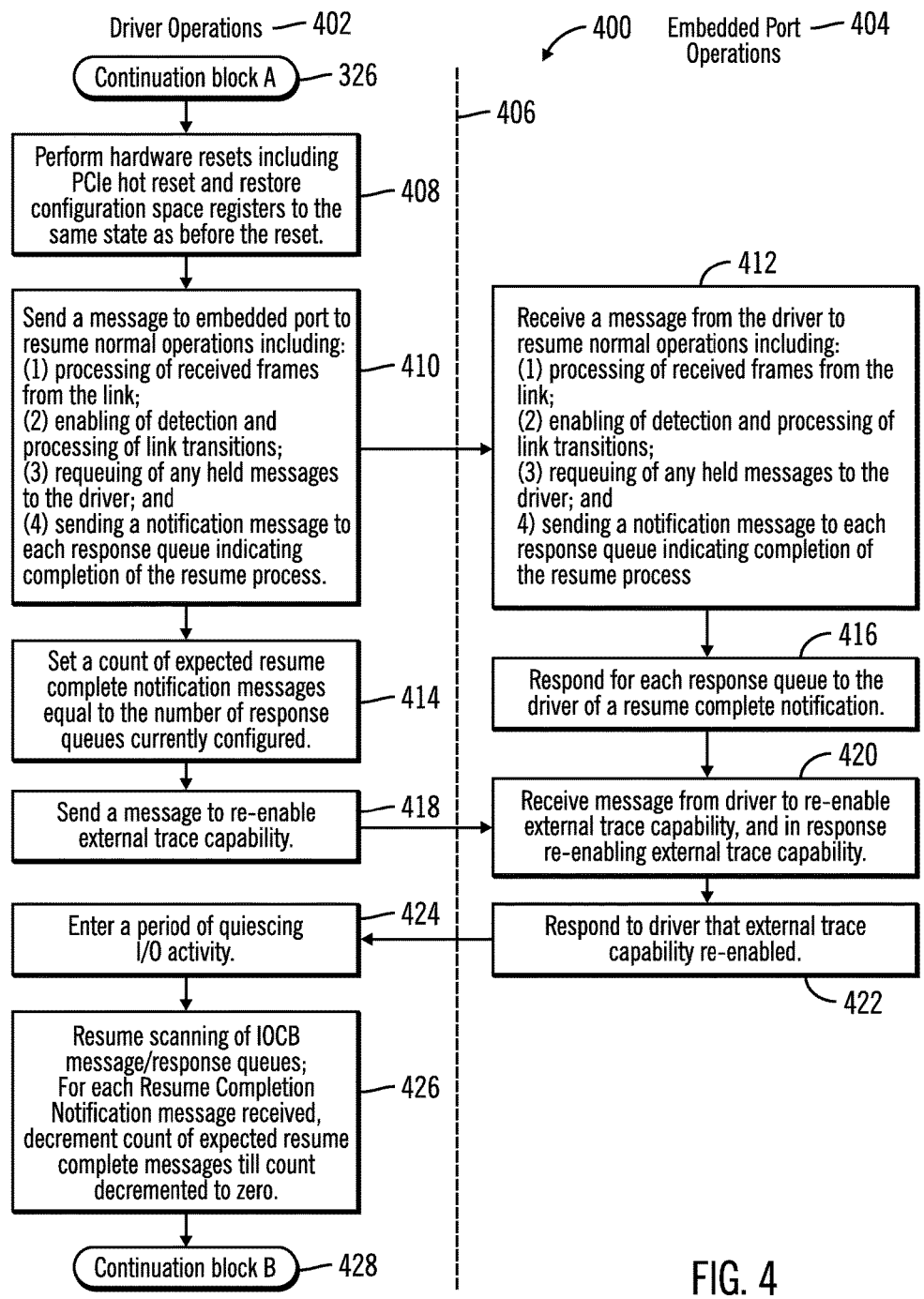
FIG. 4 illustrates a third flowchart that operations of a driver and an embedded port that use the application programming interface for reinitialization of storage controller elements, in accordance with certain embodiments.

FIG. 4 illustrates a third flowchart 400 that shows operations of a driver 120 and an embedded port 106 that use the application programming interface for reinitialization of storage controller elements, in accordance with certain embodiments. The driver operations 402 and the embedded port operations 404 are shown to the left and right of the dashed line 406 respectively.

From continuation block 326 control proceeds to block 408 in which the driver 120 performs hardware resets including PCIe hot reset and restores configuration space registers of the PCIe bus, etc., to the same state as before the reset. The driver 120 sends (at block 410) a message to the embedded port 120 to resume normal operations including:
(1) processing of received frames from the link;
(2) enabling of detection and processing of link transitions;
(3) requeuing of any held messages to the driver; and
(4) sending a notification message to each response queue indicating completion of the resume process.

Control proceeds to block 412 in which the embedded port 106 receives the message from the driver 120 to resume normal operations including:
(1) processing of received frames from the link;
(2) enabling of detection and processing of link transitions;
(3) requeuing of any held messages to the driver; and
(4) sending a notification message to each response queue indicating completion of the resume process.

The embedded port 106 responds (at block 416) for each response queue to the driver 120 of the resume complete notification.

From block 410 control also proceeds to block 414 in which the driver 120 sets a count of expected resume complete notification messages equal to the number of response queues currently configured. The driver 120 sends (at block 418) a message to re-enable (i.e., enable once again) external trace capability. It may be noted that external trace goes into memory outside of the embedded port 106. The embedded port 106 receives (at block 420) the message from the driver 120 to re-enable external trace capability, and in response re-enables external trace capability and responds (at block 422) that external trace capability has been re-enabled. Control proceeds to block 424 in which the driver 120 enters a period of quiescing I/O activity.

From block 424 control proceeds to block 426 in which the driver 120 resumes scanning of I/O control block (IOCB) message/response queues, and for each resume completion notification received, decrements count of expected resume complete messages till the count is decremented to zero. Control then proceeds to continuation block B 428 which continues the flowchart in a subsequent figure.

Figure 5:
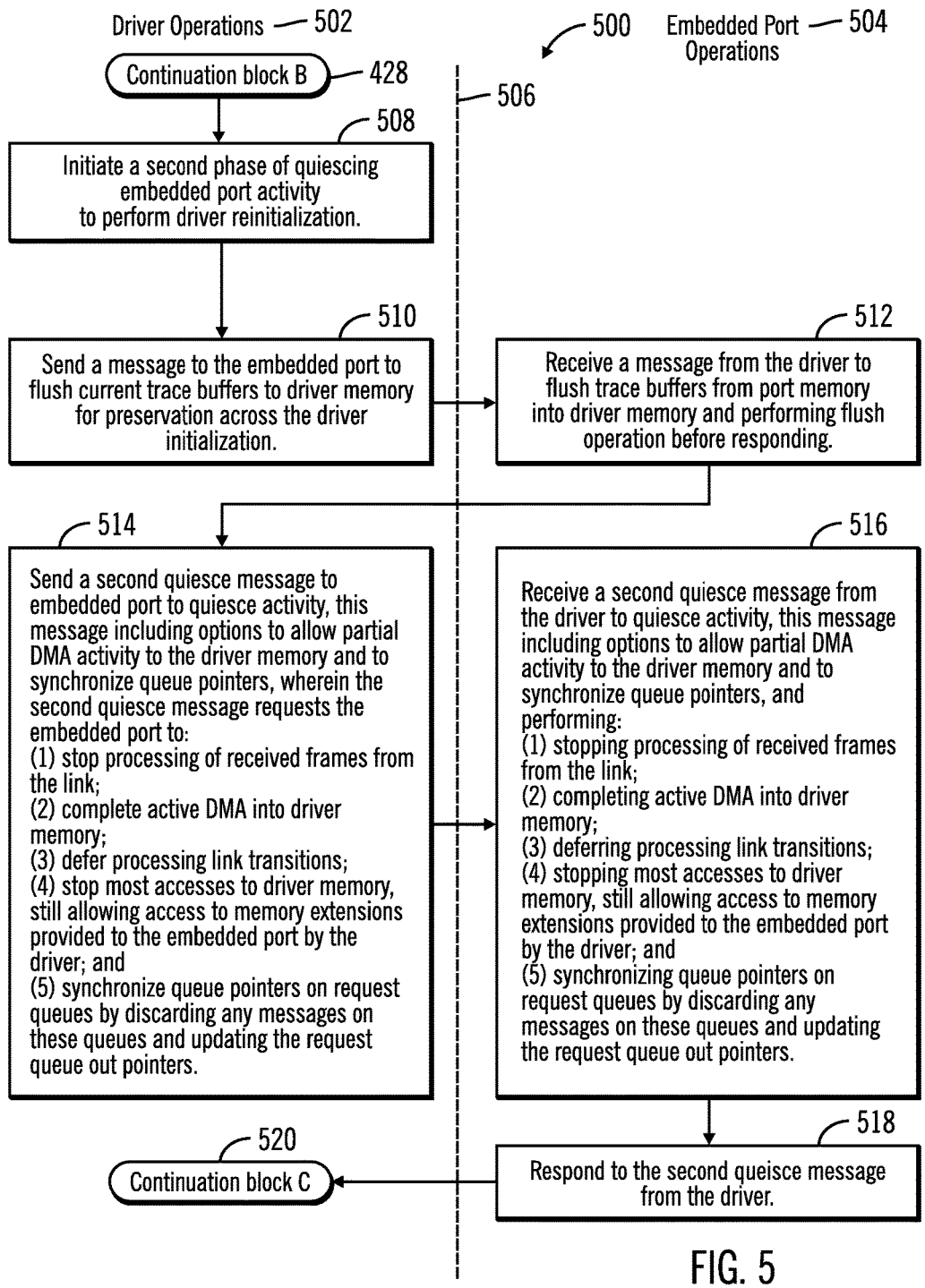
FIG. 5 illustrates a fourth flowchart that shows operations of a driver and an embedded port that use the application programming interface for reinitialization of storage controller elements, in accordance with certain embodiments.

FIG. 5 illustrates a fourth flowchart 500 that shows operations of a driver 120 and an embedded port 106 that use the application programming interface for reinitialization of storage controller elements, in accordance with certain embodiments. The driver operations 502 and the embedded port operations 504 are shown to the left and right of the dashed line 506 respectively.

From continuation block 428 control proceeds to block 508 in which the driver 120 initiates a second phase of quiescing embedded port activity to perform driver reinitialization. The driver 120 sends (at block 510) a message to the embedded port 106 to flush current trace buffers to driver memory for preservation across the driver initialization. The embedded port 106 receives the message from the driver 120 to flush trace buffers from port memory into driver memory, and the embedded port 106 performs the flush operation before responding (at block 512). Control proceeds to block 514 in which the driver 120 sends a second quiesce message to the embedded port 106 to quiesce activity, this message including options to allow partial direct memory access (DMA) activity to the driver memory and to synchronize queue pointers, where the second quiesce message requests the embedded port to:
(1) stop processing of received frames from the link;
(2) complete active DMA into driver memory;
(3) defer processing of link transitions;

(4) stop most accesses to driver memory, still allowing access to memory extensions provided to the embedded port by the driver; and
(5) synchronize queue pointers on request queues by discarding any messages on these queues and updating the request queue out pointers.

The embedded port 106 receives (at block 516) the second quiesce message from the driver 120 to quiesce activity, this message including options to allow partial DMA activity to the driver memory and to synchronize queue pointers, and performs:
(1) stopping processing of received frames from the link;
(2) completing active DMA into driver memory;
(3) deferring processing of link transitions;
(4) stopping most accesses to driver memory, still allowing access to memory extensions provided to the embedded port by the driver; and
(5) synchronizing queue pointers on request queues by discarding any messages on these queues and updating the request queue out pointers.

The embedded port 106 then responds (at block 518) to the second quiesce message from the driver 120 and control proceeds to continuation block C 520 which continues the flowchart in a subsequent figure.

Figure 6:
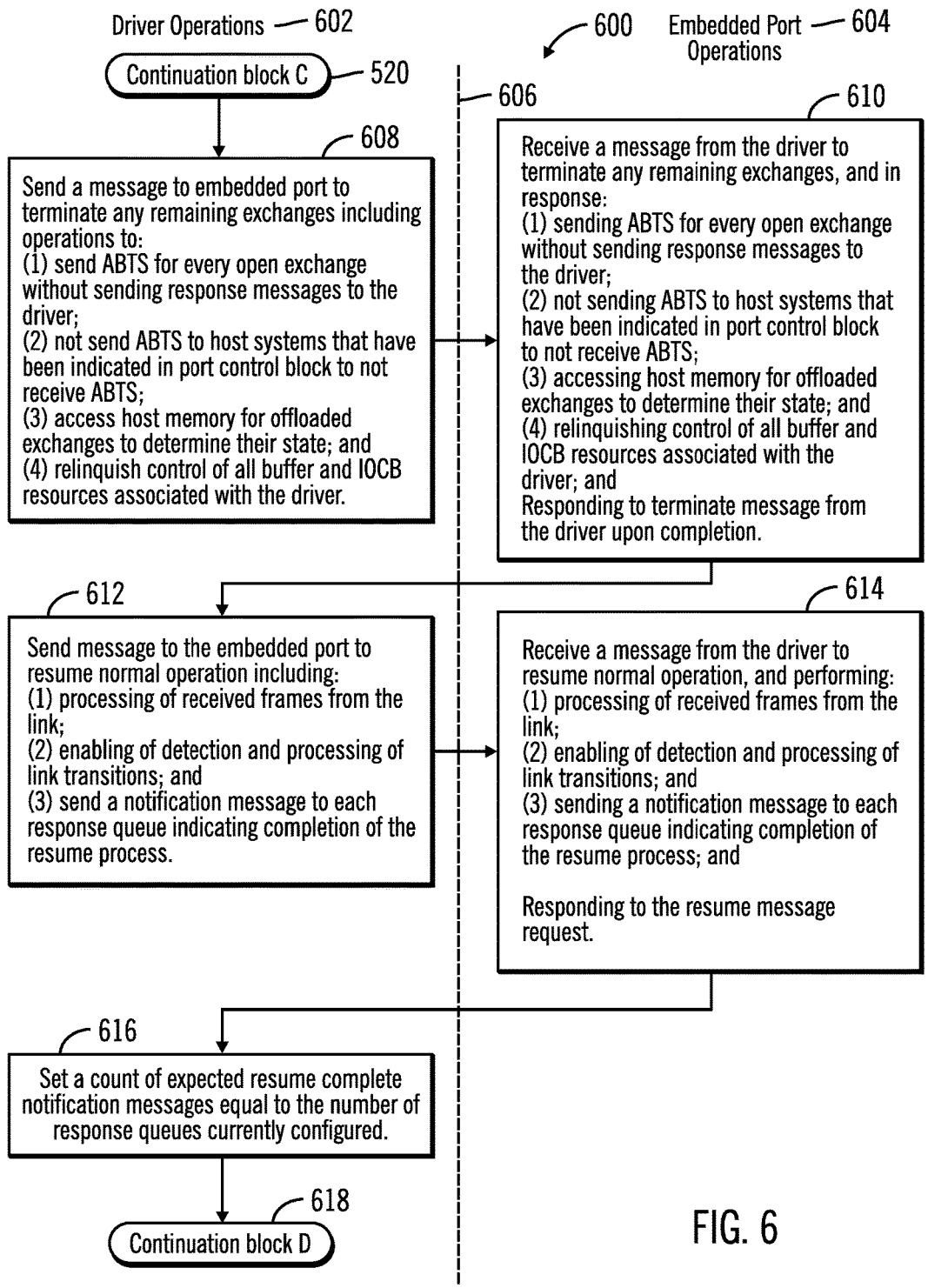
FIG. 6 illustrates a fifth flowchart that shows operations of a driver and an embedded port that use the application programming interface for reinitialization of storage controller elements, in accordance with certain embodiments.

FIG. 6 illustrates a fifth flowchart 600 that shows operations of a driver 120 and an embedded port 106 that use the application programming interface for reinitialization of storage controller elements, in accordance with certain embodiments. The driver operations 602 and the embedded port operations 604 are shown to the left and right of the dashed line 606 respectively.

Control proceeds from continuation block C 520 block 608 in which the driver 120 sends a message to embedded port 106 to terminate any remaining exchanges including operations to:
(1) send an abort sequence (ABTS) for every open exchange without sending response messages to the driver;
(2) not send ABTS to host systems that have been indicated in port control block to not receive ABTS;
(3) access host memory for offloaded exchanges to determine their state; and
(4) relinquish control of all buffer and IOCB resources associated with the driver.

Control proceeds to block 610 in which the embedded port 120 receives a message from the driver to terminate any remaining exchanges, and in response performs:
(1) sending ABTS for every open exchange without sending response messages to the driver;
(2) not sending ABTS to host systems that have been indicated in port control block to not receive ABTS;
(3) accessing host memory for offloaded exchanges to determine their state; and
(4) relinquishing control of all buffer and IOCB resources associated with the driver, and then the embedded port 106 responds to the terminate message from the driver 120 upon completion.

The driver 120 sends (at block 612) a message to the embedded port 120 to resume normal operation including
(1) processing of received frames from the link;
(2) enabling of detection and processing of link transitions; and
(3) send a notification message to each response queue indicating completion of the resume process.

The embedded port 106 receives (at block 614) a message from the driver 120 to resume normal operation, and performs:
(1) processing of received frames from the link;
(2) enabling of detection and processing of link transitions; and
(3) sending a notification message to each response queue indicating completion of the resume process.

The embedded port 106 also responds (at block 614) to the resume normal operation message request from the driver 120. The driver 120 sets (at block 616) a count of expected resume complete notification messages equal to the number of response queues currently configured. Control proceeds to continuation block D 618 which continues the flowchart in a subsequent figure.

Figure 7:
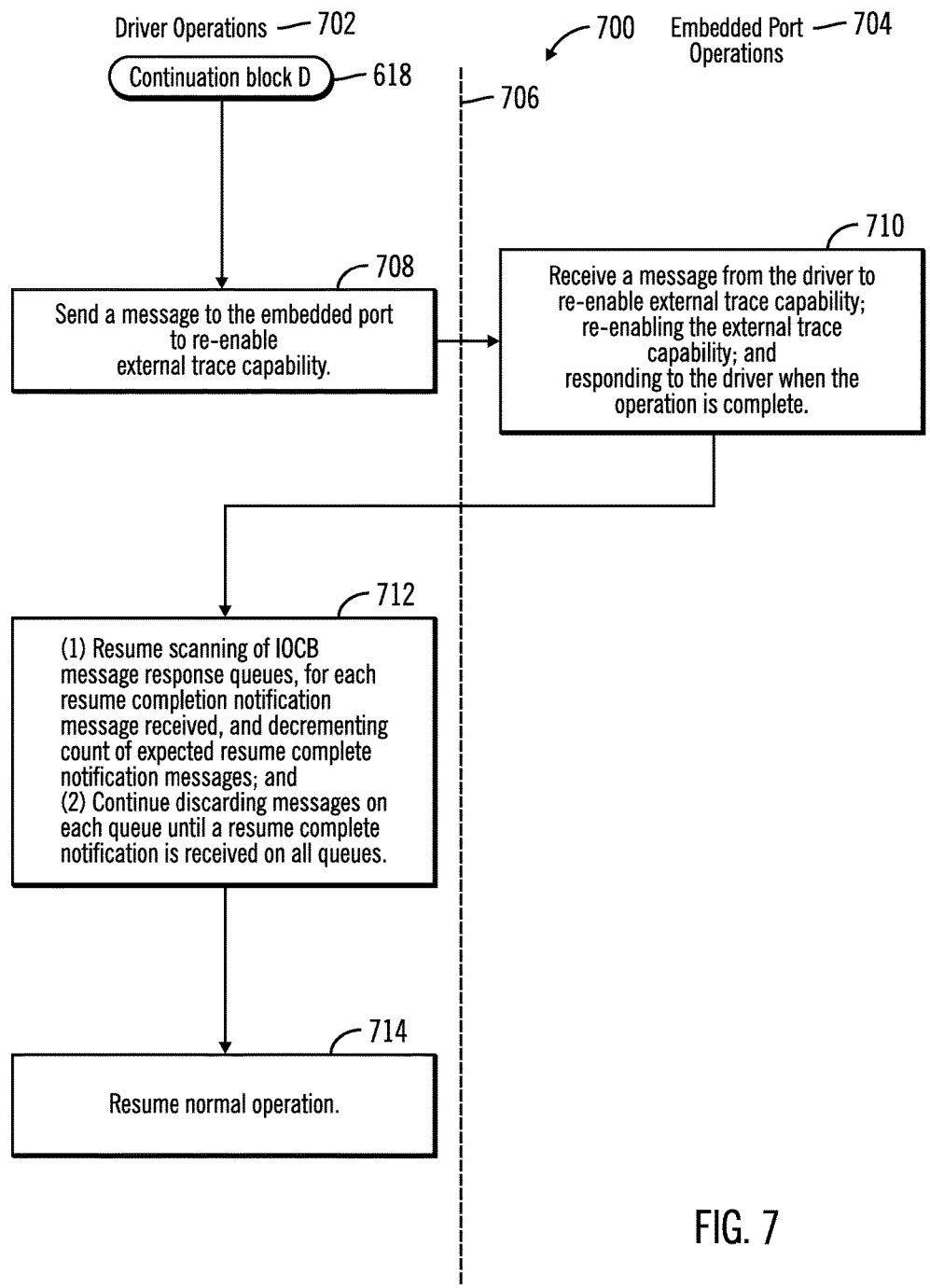
FIG. 7 illustrates a sixth flowchart that shows operations of a driver and an embedded port that use the application programming interface for reinitialization of storage controller elements, in accordance with certain embodiments.

FIG. 7 illustrates a sixth flowchart 700 that shows operations of a driver 120 and an embedded port 106 that use the application programming interface for reinitialization of storage controller elements, in accordance with certain embodiments. The driver operations 602 and the embedded port operations 604 are shown to the left and right of the dashed line 606 respectively.

From continuation block D 702 control proceeds to block 708 in which the driver 120 sends a message to the embedded port 106 to re-enable (i.e., enable once again) external trace capability, The embedded port 106 receives (at block 710) a message from the driver 120 to re-enable external trace capability, re-enables the external trace capability, and responds to the driver 120 when the operation is complete.

Control proceeds to block 712 in which the driver 120 resumes scanning of I/O control block (IOCB) message response queues, for each resume completion notification message received, and decrements the count of expected resume complete notification messages. The driver 120 continues discarding messages on each queue until a resume complete notification is received on all queues. The driver 106 then resumes (at block 714) normal operation and the embedded port 120 also resumes normal operation in response to a command from the driver 106.

Therefore FIGS. 3-7 illustrate operations performed by the driver 120 and the embedded port 106 to perform the reinitialization of storage controller components in two quiescing periods to minimize disruption to I/O activity in the host bus adapter 104 that is in communication with the hosts 110, 112.

Figure 8:
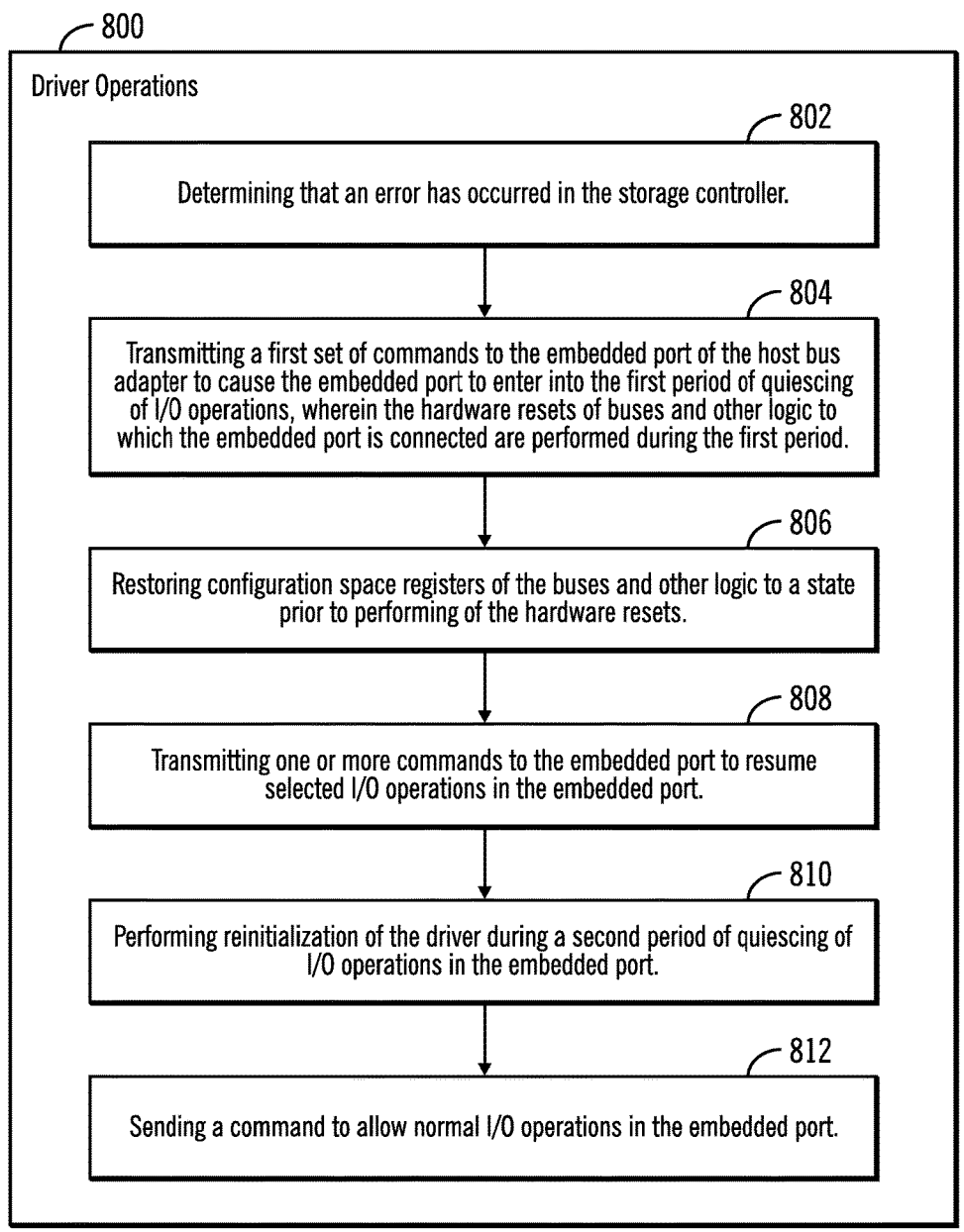
FIG. 8 illustrates a seventh flowchart that shows operations of a driver that uses the application programming interface for reinitialization of storage controller elements, in accordance with certain embodiments.

FIG. 8 illustrates a seventh flowchart 800 that shows operations of a driver 120 that uses the application programming interface 122 for reinitialization of storage controller elements, in accordance with certain embodiments.

Control starts at block 802, in which the driver 120 determines that an error has occurred in the storage controller 102 that requires a reinitialization (i.e., a initialization once again) of storage controller elements. The driver 120 transmits (at block 804) a first set of commands to the embedded port 106 of the host bus adapter 104 to cause the embedded port 106 to enter into the first period of quiescing of I/O operations, where the hardware resets of buses 114 and other logic (e.g., ASIC 118) to which the embedded port 106 is connected are performed during the first period.

The driver 120 then restores (at block 806) the configuration space registers of the buses 114 and other logic 118 to a state that the configuration space registers were in prior to the performing of the hardware resets. The driver 120 then transmits (at block 808) one or more commands to the embedded port 106 to resume selected I/O operations in the embedded port 106.

Control proceeds to block 810, in which the driver 120 is reinitialized during a second period of quiescing of I/O operations in the embedded port 106. The driver 120 then sends (at block 812) a command to allow normal I/O operations in the embedded port 106.

Therefore, FIG. 8 illustrates certain operations performed by the driver 120 for reinitialization of storage controller elements with minimal impact to I/O operations.

Figure 9:
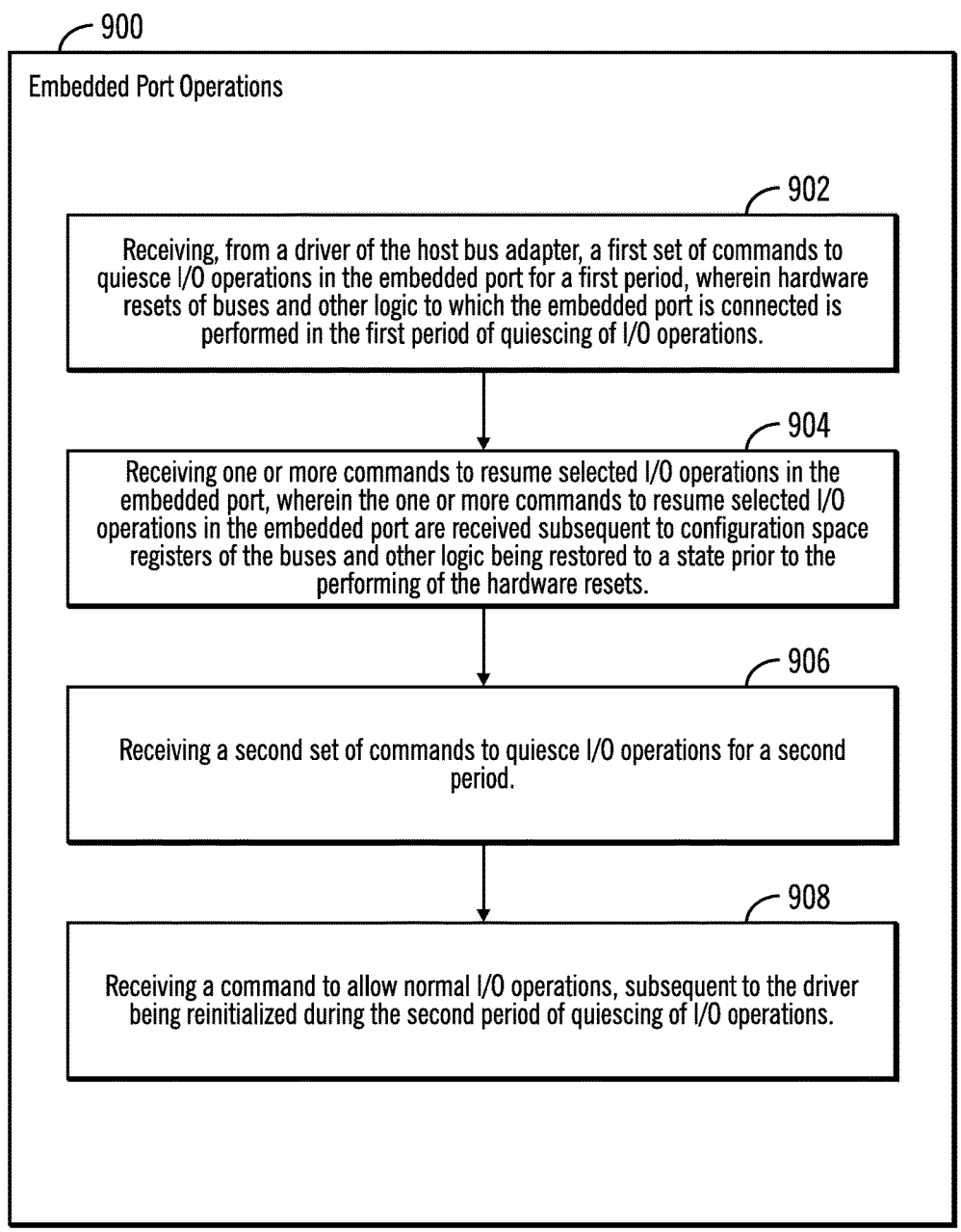
FIG. 9 illustrates a eighth flowchart that shows operations of an embedded port that uses the application programming interface for reinitialization of storage controller elements, in accordance with certain embodiments.

FIG. 9 illustrates a eighth flowchart 900 that shows operations of an embedded port 106 that uses the application programming interface 122 for reinitialization of storage controller elements, in accordance with certain embodiments.

Control starts at block 902 in which the embedded port 106 receives from a driver 120 of the host bus adapter 104, a first set of commands to quiesce I/O operations in the embedded port 106 for a first period, wherein hardware resets of buses 114 and other logic 118 to which the embedded port 106 is connected is performed in the first period of quiescing of I/O operations.

The embedded port 106 receives (at block 904) one or more commands to resume selected I/O operations in the embedded port 106, where the one or more commands to resume selected I/O operations in the embedded port 106 are received subsequent to configuration space registers of the buses 114 and other logic 118 being restored to a state prior to the performing of the hardware resets.

Control proceeds to block 906 in which the embedded port 106 receives a second set of commands to quiesce I/O operations for a second period. The embedded port receives a command to allow normal I/O operations, subsequent to the driver 120 being initialized during the second period of quiescing of I/O operations.

Therefore, FIG. 9 illustrates certain operations performed by the port 106 for reinitialization of storage controller elements with minimal impact to I/O operations.

FIGS. 1-9 illustrate certain embodiments in which the impact to host I/O when performing a fast reset on a host bus adapter 104 is minimized. Two quiesce periods are used for host I/O operations. In a first quiesce period, the embedded port 106 stops processing any incoming frames and stops direct memory access (DMA) access from the embedded port 106. The first quiesce period allows for the resetting of host adapter hardware such as a controller ASIC 118 and hot resets of PCIe buses 114 to which the embedded port 106 is connected. A second quiesce process allows for reinitialization of the host adapter processor's 116 internal structures and state by reinitialization of the driver 120 and subsequently normal I/O operations are resumed for the embedded port 106.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
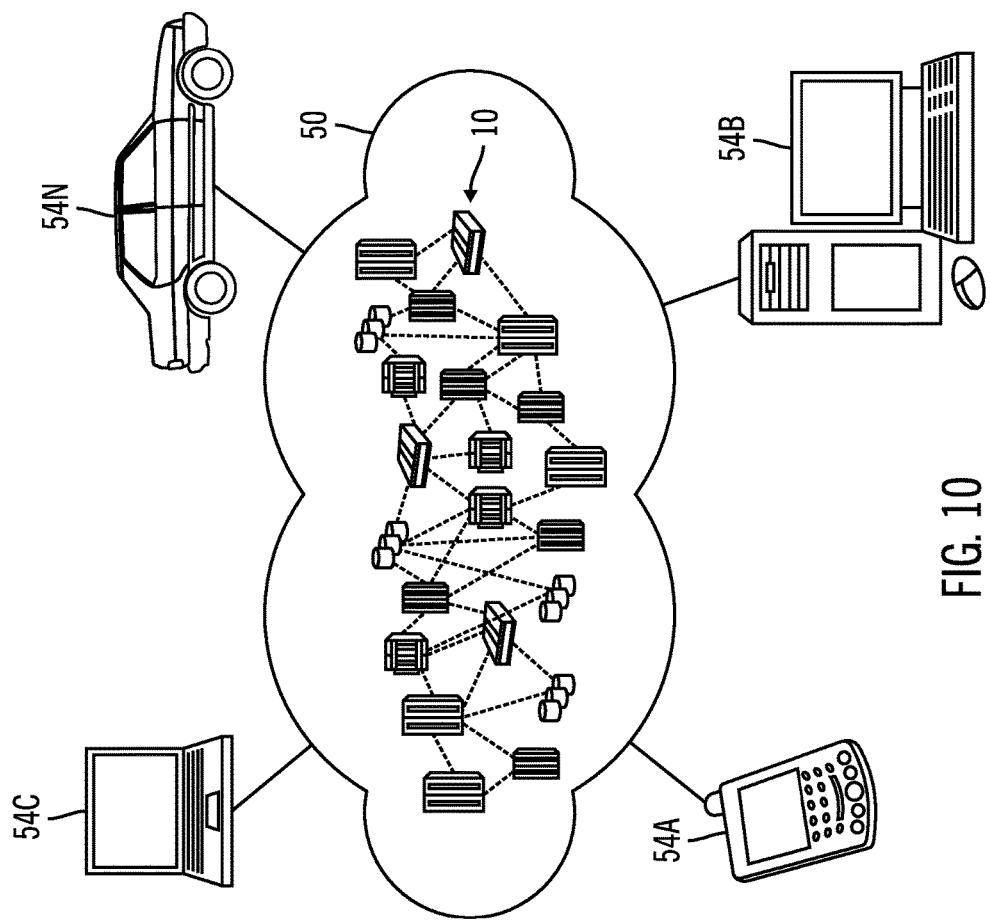
FIG. 10 illustrates a block diagram of a cloud computing environment, in accordance with certain embodiments.

Referring now to FIG. 10, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
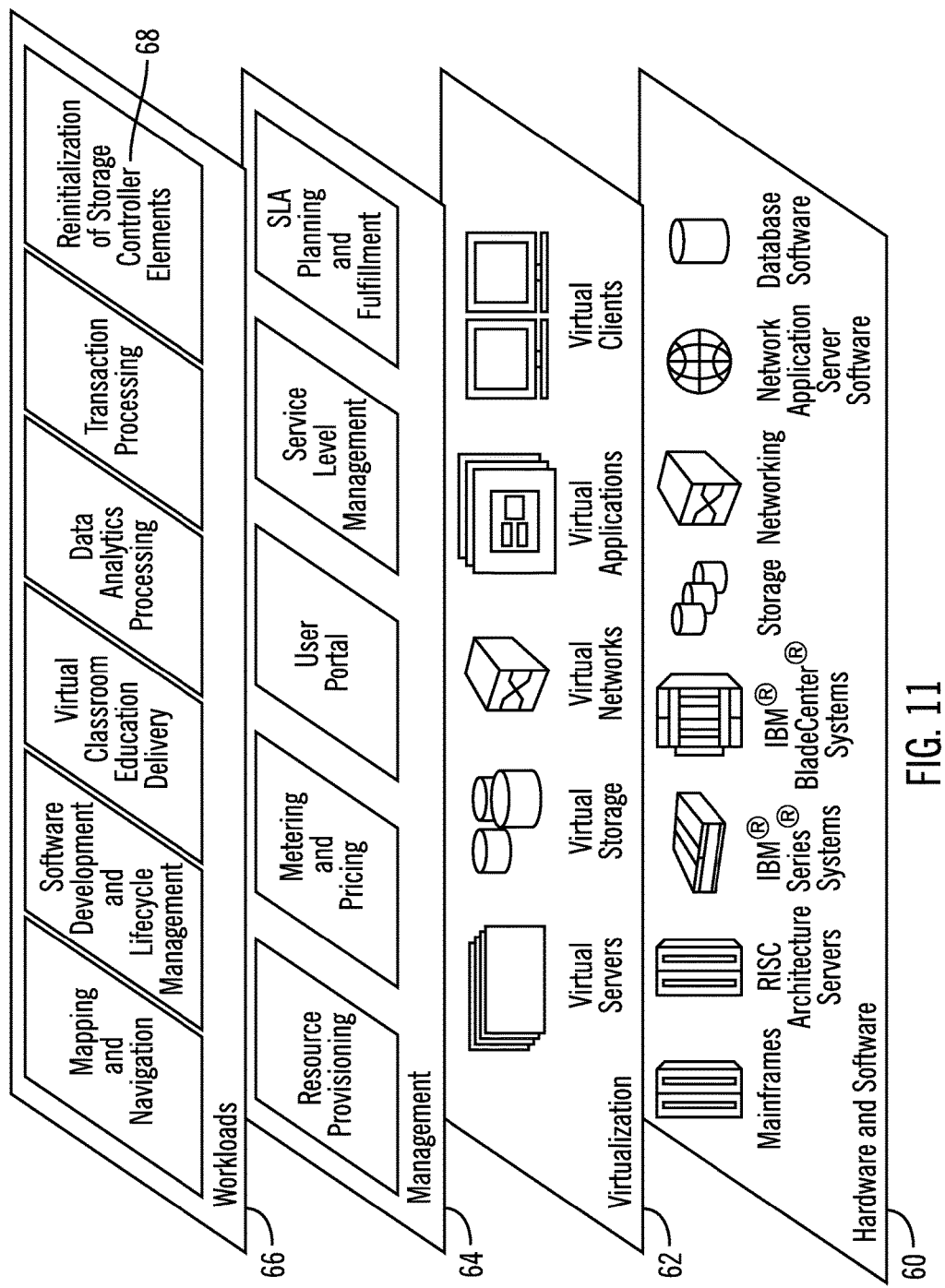
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the reinitialization of storage controller elements 68 as shown in FIGS. 1-9.

Additional Embodiment Details

The described operations may be implemented as a method, apparatus or computer program product using standard programming and/or engineering techniques to produce software, firmware, hardware, or any combination thereof.

Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 12:
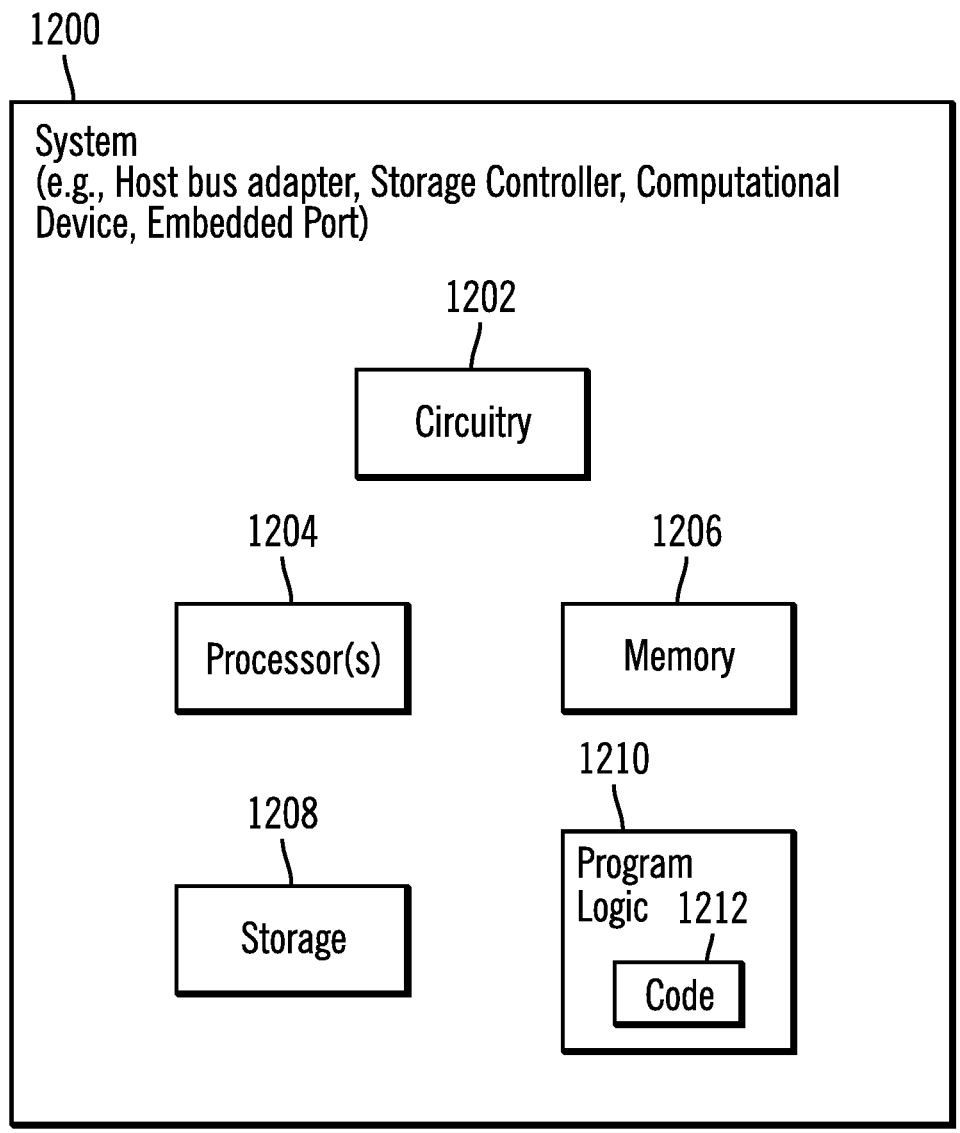
FIG. 12 illustrates a block diagram of a computational system that shows certain elements that may be included in the storage controller, the host bus adapter, the embedded port, and the host shown in FIG. 1, in accordance with certain embodiments.

FIG. 12 illustrates a block diagram that shows certain elements that may be included in the host bus adapter 104, the storage controller 102, the embedded port 106, or other computational devices in accordance with certain embodiments. The system 1200 may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method performed by a driver of a host bus adapter of a storage controller, the method comprising:
   in response to determining that an error has occurred in the storage controller, transmitting a first set of commands to an embedded port of the host bus adapter to cause the embedded port to enter into a first period of quiescing of I/O operations, wherein hardware resets of buses and other logic to which the embedded port is connected are performed during the first period;
   restoring configuration space registers of the buses and other logic to a state prior to performing of the hardware resets and subsequently transmitting, by the driver, one or more commands to the embedded port to resume selected I/O operations in the embedded port;
   subsequent to resumption and completion of the selected I/O operations, transmitting a second set of commands to the embedded port to cause the embedded port to enter into a second period of quiescing of I/O operations; and
   performing reinitialization of the driver during the second period of quiescing of I/O operations in the embedded port, prior to sending a command to allow normal I/O operations in the embedded port.

2. The method of claim 1, wherein the transmitted first set of commands comprises requests to perform operations in the embedded port including:
   quiescing processing of received frames from a link;
   latching states of selected hardware inputs;
   completing active direct memory access into driver memory;
   deferring processing of link transitions;
   stopping all accesses to driver memory; and
   dequeing any messages to be sent to the driver.

3. The method of claim 1, wherein the one or more commands to resume selected I/O operations in the embedded port include requests to:
   resume processing of received frames from a link;
   enable detection and processing of link transitions;
   requeue any held messages to the driver; and
   send a notification message to each response queue indicating completion of the selected I/O operations.

4. The method of claim 1, wherein the second set of commands comprise options to allow partial direct memory access (DMA) activity to driver memory and to synchronize queue pointers, and wherein the second set of commands requests the embedded port to:
   stop processing of received frames from a link;
   complete active DMA into driver memory;
   defer processing link transitions;
   stop a majority of accesses to driver memory, while allowing access to memory extensions provided to the embedded port by the driver; and
   synchronize queue pointers on request queues by discarding any messages on the request queues and updating the request queue out pointers.

5. The method of claim 1, wherein the second set of commands further comprises sending a message to the embedded port to terminate any remaining exchanges including operations to:
   send an abort sequence (ABTS) for every open exchange without sending response messages to the driver;
   not send any ABTS to host systems that have been indicated in port control block to not receive any ABTS;
   access host memory for offloaded exchanges to determine state information; and
   relinquish control of all buffer and I/O control block (IOCB) resources associated with the driver.

6. A system, comprising:
   a memory; and
   a processor coupled to the memory, wherein the processor performs operations, the operations comprising:
      in response to determining that an error has occurred, transmitting, by a driver, a first set of commands to an embedded port of a host bus adapter to cause the embedded port to enter into a first period of quiescing of I/O operations, wherein hardware resets of buses and other logic to which the embedded port is connected are performed during the first period;
      restoring configuration space registers of the buses and other logic to a state prior to performing of the hardware resets and subsequently transmitting, by the driver, one or more commands to the embedded port to resume selected I/O operations in the embedded port; and
      subsequent to resumption and completion of the selected I/O operations, transmitting a second set of commands to the embedded port to cause the embedded port to enter into a second period of quiescing of I/O operations; and
      performing reinitialization of the driver during the second period of quiescing of I/O operations in the embedded port, prior to sending a command to allow normal I/O operations in the embedded port.

7. The system of claim 6, wherein the transmitted first set of commands comprises requests to perform operations in the embedded port including:
   quiescing processing of received frames from a link;
   latching states of selected hardware inputs;
   completing active direct memory access into driver memory;
   deferring processing of link transitions;
   stopping all accesses to driver memory; and
   dequeing any messages to be sent to the driver.

8. The system of claim 6, wherein the one or more commands to resume selected I/O operations in the embedded port include requests to:
   resume processing of received frames from a link;
   enable detection and processing of link transitions;
   requeue any held messages to the driver; and
   send a notification message to each response queue indicating completion of the selected I/O operations.

9. The system of claim 6, wherein the second set of commands comprise options to allow partial direct memory access (DMA) activity to driver memory and to synchronize queue pointers, wherein the second set of commands requests the embedded port to:
   stop processing of received frames from a link;
   complete active DMA into driver memory;
   defer processing link transitions;
   stop a majority of accesses to driver memory, while allowing access to memory extensions provided to the embedded port by the driver; and
   synchronize queue pointers on request queues by discarding any messages on the request queues and updating the request queue out pointers.

10. The system of claim 6, wherein the second set of commands further comprises sending a message to the embedded port to terminate any remaining exchanges including operations to:
    send an abort sequence (ABTS) for every open exchange without sending response messages to the driver;
    not send any ABTS to host systems that have been indicated in port control block to not receive any ABTS;
    access host memory for offloaded exchanges to determine state information; and
    relinquish control of all buffer and I/O control block (IOCB) resources associated with the driver.

11. A computer program product, the computer program product comprising a computer readable storage medium having computer readable program code embodied therewith, the computer readable program code configured to perform operations, the operations comprising:
    in response to determining that an error has occurred in s storage controller, transmitting, by a driver, a first set of commands to an embedded port of a host bus adapter to cause the embedded port to enter into a first period of quiescing of I/O operations, wherein hardware resets of buses and other logic to which the embedded port is connected are performed during the first period;
    restoring configuration space registers of the buses and other logic to a state prior to performing of the hardware resets and subsequently transmitting, by the driver, one or more commands to the embedded port to resume selected I/O operations in the embedded port; and
    subsequent to resumption and completion of the selected I/O operations, transmitting a second set of commands to the embedded port to cause the embedded port to enter into a second period of quiescing of I/O operations; and
    performing reinitialization of the driver during the second period of quiescing of I/O operations in the embedded port, prior to sending a command to allow normal I/O operations in the embedded port.

12. The computer program product of claim 11, wherein the transmitted first set of commands comprises requests to perform operations in the embedded port including:
  quiescing processing of received frames from a link;
  latching states of selected hardware inputs;
  completing active direct memory access into driver memory;
  deferring processing of link transitions;
  stopping all accesses to driver memory; and
  dequeing any messages to be sent to the driver.

13. The computer program product of claim 11, wherein the one or more commands to resume selected I/O operations in the embedded port include requests to:
  resume processing of received frames from a link;
  enable detection and processing of link transitions;
  requeue any held messages to the driver; and
  send a notification message to each response queue indicating completion of the selected I/O operations.

14. The computer program product of claim 11, wherein the second set of commands comprise options to allow partial direct memory access (DMA) activity to driver memory and to synchronize queue pointers, wherein the second set of commands requests the embedded port to:
  stop processing of received frames from a link;
  complete active DMA into driver memory;
  defer processing link transitions;
  stop a majority of accesses to driver memory, while allowing access to memory extensions provided to the embedded port by the driver; and
  synchronize queue pointers on request queues by discarding any messages on the request queues and updating the request queue out pointers.

15. The computer program product of claim 11, wherein the second set of commands further comprises sending a message to the embedded port to terminate any remaining exchanges including operations to:
  send an abort sequence (ABTS) for every open exchange without sending response messages to the driver;
  not send any ABTS to host systems that have been indicated in port control block to not receive any ABTS;
  access host memory for offloaded exchanges to determine state information; and
  relinquish control of all buffer and I/O control block (IOCB) resources associated with the driver.

* * * * *